United States Patent [19]

Tsang

[11] 4,226,921

[45] Oct. 7, 1980

[54] SELECTIVE PLUGGING OF BROKEN FIBERS IN TUBESHEET-HOLLOW FIBER ASSEMBLIES

[75] Inventor: Floris Y. Tsang, Walnut Creek, Calif.

[73] Assignee: The Dow Chemical Company, Midland, Mich.

[21] Appl. No.: 57,926

[22] Filed: Jul. 16, 1979

[51] Int. Cl.$^2$ ............................................. H01M 2/14
[52] U.S. Cl. .................................. 429/104; 429/193; 264/36
[58] Field of Search ................. 429/104, 193, 191, 31, 429/102, 218; 264/36

[56] References Cited

U.S. PATENT DOCUMENTS

| | | | |
|---|---|---|---|
| 3,499,062 | 3/1970 | Geary, Jr. et al. | 264/36 |
| 3,679,480 | 7/1972 | Brown et al. | 429/104 |
| 3,968,192 | 7/1976 | Hoffmann et al. | 264/36 |
| 4,170,695 | 10/1979 | Brown et al. | 429/193 |

*Primary Examiner*—Anthony Skapars

*Attorney, Agent, or Firm*—R. R. Stringham

[57] ABSTRACT

There is disclosed a method of selectively plugging broken fibers included in a bundle of hollow fibers having open ends terminating in or protruding from one face of a tubesheet and closed ends or loops depending from the other face of the tubesheet. The open ends are covered with a curable and flowable sealant and a pressure differential is utilized to draw the sealant into the broken fibers. The resistance to compression of the gases in the unbroken fibers is such that the sealant does not move into them a substantial distance. The sealant is diluted and another pressure differential employed to expel the sealant from the good fibers. The diluted sealant is removed and the plugs in the broken fibers are cured. This method is of particular value in preparing tubesheet-fiber assemblies for use in high temperature alkali metal-sulfur battery cells, wherein the hollow fibers function as an electrolyte separator, but also has utility for remedying leaks in devices employing hollow fibers as separatory membranes.

9 Claims, No Drawings

SELECTIVE PLUGGING OF BROKEN FIBERS IN TUBESHEET-HOLLOW FIBER ASSEMBLIES

BACKGROUND OF THE INVENTION

A variety of permeability separatory devices in which the membrane takes the form of a large number of fine hollow fibers is known. In another type of application, hollow fibers composed of materials capable of transporting alkali metal cations and resistant to the molten metal, and to molten alkali metal polysulfides, have found use as electrolyte-separators in high temperature alkali metal-sulfur battery cells (see U.S. Pat. Nos. 3,476,602; 3,765,944 and 3,791,868, for example).

Common to both permeability separatory devices and battery cells of the foregoing types is the use of at least one "tubesheet" or relatively thin wall member which is sealingly engaged with the fiber exteriors and functions to separate different bodies of fluid in contact with the interior and exterior surfaces of the fibers (and to fix the position of the fibers within the device or cell).

Hollow fibers, i.e., thin-walled, hairlike tubules, are relatively fragile, particularly when composed of materials, such as glasses or ceramics, which are suitable for use in high temperature batteries. Consequently, it is quite difficult to avoid breaking at least several fibers when fabricating tubesheet-fiber assemblies. Even though only a few fibers out of a million may be broken, the resulting assembly will generally be useless for its intended purpose. This is particularly so in applications such as blood dialysis or high temperature batteries.

Several methods are known for salvaging tubesheet-hollow fiber assemblies made from resinous materials, but such methods are either inoperable or impractical when the assembly is composed of materials suitable for use in batteries operating at temperatures of 300° C. or more and containing molten alkali metals and corresponding polysulfides (or halides).

Exemplary of known salvage methods are those disclosed in U.S. Pat. Nos. 3,499,062 and 3,968,192.

The U.S. Pat. No. 3,499,062 discloses (at columns 23 and 24) a method of repairing leaks in a fluid separation apparatus comprising a plurality of open-ended, generally parallel hollow fibers, potted at each end in "wall members" or tubesheets; and a tubular casing sealed to the peripheral surfaces of the tubesheets. Openings in the outer surface of a given tubesheet which connect to a leak through the tubesheet itself or to a leaking fiber are closed by forming a pool of a curable resinous liquid on the tubesheet surface, drawing enough of it into the leak connected opening to close off the leak or leaking fiber, removing the excess liquid and solidifying the remainder in place. (If the leak is in a fiber, the terminous of the fiber lumen in each of the two tubesheets must be so closed.)

In this method, flow of the resinous liquid into fibers which are not leaking is prevented by maintaining the liquid under a pressure which is greater than that exterior to the fibers but less than the pressure applied to the fiber lumens at their uncovered ends.

The U.S. Pat. No. 3,968,192 discloses an alternate method of salvaging leaky tubesheet-hollow fiber assemblies of the above-described type. The fiber and tubesheet materials are either thermoplastic or are heat-degradable to same, and the leak-connected openings are first located and then closed by localized, temporary application of heat and mechanical pressure to the materials in their immediate vicinity.

Neither of the foregoing methods is applicable to tubesheet-fiber assemblies which must function in corrosive, high temperature environments. In order to effectively plug any broken fibers in such assemblies, the plugging material, or "sealant", must meet several requirements which cannot be met by resinous materials. That is, the sealant not only must be fluid enough to be forced into the broken fibers (and any open channels through the tubesheet) under practicable operating conditions but also must be convertible, in situ and at temperatures below the distortion temperatures of the assembly materials, to a rigid, non-porous solid which is bonded to the fiber or channel walls, has a coefficient of expansion which adequately matches that of the fiber material and which will endure in the environment and at the temperatures it is exposed to during operation of the device.

Also, the technique used to prevent sealing off of good fibers in the process of the U.S. Pat. No. 3,499,062 cannot be used with fibers having closed ends. Although entry of the sealant into good fibers will be resisted by compression of the air in those fibers, enough sealant can still enter to effectively plug them.

A method of plugging defective fibers which is suitable for fiber/tubesheet assemblies to be used in high teperature batteries (and for remedying leaks in hollow fiber type permeability separatory devices as well) is disclosed in a co-pending application, Ser. No. 835,567, filed Sept. 22, 1977 in the name of W. E. Brown and F. Y. Tsang as inventors and entitled "Selective Plugging of Broken Fibers in Tubesheet-Hollow Fiber Assemblies". In this method, the open ends of the fibers protrude above the tubesheet and are immersed in a fluid, curable sealant. The broken fibers imbibe the sealant, by capillary attraction, to a level below the tubesheet surface. The sealant is not comparably imbibed by the good fibers, due to the resistance to compression of the gas they contain. The imbibed sealant is cured in place and the protruding fiber ends cut off flush with the tubesheet surface, thus re-opening the good fibers but leaving the bad fibers plugged.

The foregoing method has the disadvantage that, because the protruding fiber ends must be cut off after the sealing operation, it cannot be utilized if the fiber/-tubesheet assembly has already been incorporated in a casing. Since fiber damage can occur during encasement of the assembly, a sealing method which avoids this disadvantage is highly to be desired. Also, the protruding fiber ends constitute something of a hindrance in handling assemblies which comprise them.

OBJECTS OF THE INVENTION

A primary object is to provide a method of sealing leaks in tubesheet-hollow fiber assemblies which does not require cutting off protruding fiber ends.

Another object is to provide such a method which can be utilized in fabricating hollow fiber-type permeability separatory devices.

A particular object is to provide such a method which can be applied to tubesheet-hollow fiber assemblies which, except for including open channels through the tubesheet and/or broken or leaking fibers, is otherwise suitable to be utilized as an electrolyte-separator in a high temperature battery.

An additional object is to provide a method which may be employed to remedy leaks in tubesheet-hollow fiber assemblies in which the hollow fibers and tubesheet are composed of glasses or ceramics.

A further object is to provide a method of salvaging devices comprising tubesheet-hollow fiber assemblies which have been enclosed in a casing but include a sufficient number of tubesheet leaks and/or broken or leaking fibers to be inoperable for their intended purpose.

Yet another object is to provide a method which may be used to salvage devices comprising hollow fiber/tubesheet assemblies, regardless of whether or not one or more tubesheet surfaces therein have open fiber ends extending out of them.

Still other objects will be made apparent to those skilled in the art by the following teachings, examples and claims.

SUMMARY OF THE INVENTION

The present invention, broadly, is a method of selectively plugging broken or imperfect fibers which, together with unbroken fibers, constitute a bundle of gas-filled, hollow fibers potted in a tubesheet body, the majority of said fibers being unbroken, i.e., having closed (or looped) ends distal from the tubesheet and open ends terminating in or protruding a short distance from the tubesheet. The gas in the good fibers is utilized to prevent substantial entry of sealant thereto—under conditions permitting sealant flow into the bad fibers. The sealant which has entered the good fibers is then expelled, by causing the gas they contain to expand, but is replaced by diluted sealant. However, the amount of sealant is then insufficient to substantially restrict the fiber lumens when the diluted sealant is freed of volatilizable substances and cured.

More specifically, the present invention may be defined as the method of treating a tubesheet/hollow fiber assembly to ensure that any defective fibers included therein will be selectively plugged, said method comprising A. providing as said assembly one which comprises a bundle of gas-filled, hollow fiber lengths passing through and sealingly engaged with a rigid, relatively thin wall-member or tubesheet having first and second generally parallel faces, each of said lengths having an open end terminating in or protruding from said first face and at least a majority of said lengths having portions depending from said second face which have closed ends or are generally U-shaped loops having second open ends terminating in or protruding from said first face, B. covering said first face with a body of a flowable, curable sealant and developing a pressure differential between said body and the exteriors of said dependent fiber portions, thereby
   (1) causing said sealant to flow into the defective fibers and/or tubesheet channels and to displace therefrom at least a portion of the gas contained therein, and
   (2) causing said sealant to flow into the open ends of the non-defective fibers to a limited extent determined by the resistance to compression of the gas they contain, C. diluting the sealant external to the fibers, D. subjecting the exteriors of said dependent fiber portions and the diluted sealant body to essentially the same reduced pressure, with the results that:

the gas in the non-defective fibers expands until the pressure inside them is the same as the pressure outside them,
the undiluted sealant in the non-defective fibers is expelled and the diluted sealant intrudes slightly into them,
the column of sealant in each defective fiber the tubesheet channel remains in place and no more than a small terminal portion of it is diluted, E. While maintaining the pressure equilibrium established in step D, removing the main body of the diluted sealant from contact with the tubesheet, F. optionally, rinsing said first face and open fiber ends with a diluent, and G. curing the sealant in the defective fibers and/or tubesheet channels, thereby plugging them, said sealant being so composed as to be convertible, in-situ in said defective fiber lengths or channels and at a temperature below the distortion temperature of said fibers, to plugs of a solid, non-porous material sealingly bonded to the fiber or channel walls and having a coefficient of expansion substantially matching that of the fiber material.

Of particular value is the embodiment of the invention, as above defined, wherein
said closed ended lengths are adapted to function as the electrolyte/separator in a high temperature battery cell,
said sealant is a suspension, in an inert, volatilizable liquid, of glass or ceramic particles which have a maximum diameter of about ⅓ or less of the inner diameter of said fiber lengths and will fuse together to form said plugs when heated to a temperature $T_1$, which is less than the distortion temperature of said lengths, and
said assembly is heated to $T_1$, thereby devolatilizing said suspension in said defective fibers and converting said particles therein to said plugs.

In a preferred mode of practicing the invention, the leak-sealing operation is carried out after the tubesheet/fiber assembly has been incorporated in a casing adapted to function as a component of a complete hollow fiber device.

DEFINITIONS

Certain of the terms used in the foregoing summary require definition and, accordingly, are defined as follows:

The term "defective" fibers is intended to refer to fiber lengths, the open ends of which terminate in or protrude from the outer ("first") tubesheet face and communicate with openings in the same lengths on the opposite ("second") side of the tubesheet, i.e., to fibers which are broken off or have incomplete walls or end closures.

The term "tubesheet channels" or "open channels through the tubesheet" is intended to include any passageway which communicates from one face of the tubesheet to the other, either through the tubesheet per se or along the interface between a fiber and the tubesheet.

The term "inert" means not detrimentally reactive to an intolerable extent.

The phrase "covering said first face" is not limited to a layer of sealant resting on a horizontal tubesheet face and applies as well to a body of sealant confined in contact with all of a tubesheet face in any other orientation.

The term "sealant" is not limited to materials suitable for use in high temperature battery cells and applies as well to resinous materials suitable for use in permeability separatory devices fabricated from materials such as cellulose, cellulose esters, polyurethanes, polycarbonates, etc.

The phrase "developing a pressure differential" is intended to include causing a force of capillary (and gravitational) attraction to be exerted as a result of covering the open ends of the defective fibers with the sealant.

It should be noted that the method of the invention is not limited in application to tubesheet/fiber assemblies in which the fibers are generally parallel to each other and generally perpendicular to the tubesheet faces. It may be practiced, for example, with fiber loops wound in a criss-crossing, spiral configuration about a central core and having their open ends terminating in the outer surface of an annular tubesheet at the end of the core. Correspondingly, the term "wall-member" is intended to include the type of box-shaped wall that is formed when a longitudinal or equatorial tubesheet is built up with a developing cylindrical or generally spherical hollow fiber bundle and then a trench is routed out in it to cut through the fiber wraps and change them to open-ended, generally U-shaped loops opening into the trench, as disclosed in U.S. Pat. Nos. 3,455,460 and 3,475,331.

The meaning of the term "substantially matching" is made evident by the subsequent discussion herein of how the difference in coefficients of expansion (for the sealant and fiber materials) which can be tolerated depends on the flexibilities of those materials and on the temperature at which the treated assembly is designed to operate.

DETAILED DESCRIPTION

Methods of constructing hollow fiber permeability separatory devices are now well known. Closed-end, unlooped fibers are generally not employed in such devices, since such purposes as may be so served can more efficiently be served by using fiber loops, i.e., fibers bent in an elongated U-shape and having both ends terminating at and opening upon the same surface of a given tubesheet. However, if it is selected to use unlooped fibers having one end closed, no fabrication techniques or apparatus arrangements not already familiar to those skilled in the art are required.

To date, fiber loops have not been proposed to be used in high temperature batteries. However, hollow fibers suitable for such use are not so stiff that they cannot be bent in a radius of the dimensions appropriate to present cell designs. The use of unlooped, closed-ended, hollow fibers is presently preferred but is not considered essential to the fabrication of volume-efficient, high temperature battery cells in which the fibers will function as the electrolyte separator.

For an exemplary description of a method of assembling hollow fiber battery cells, reference may be had to the aforementioned U.S. Pat. No. 3,791,868 and to U.S. Pat. No. 3,917,490 (Example 4; column 9).

A typical, high temperature battery cell to which the present invention applies is an alkali-metal/sulfur cell in which the electrolyte takes the form of a large number of closely spaced, alkali-metal cation conductive, unlooped hairlike glass or ceramic tubules. A generally cylindrical cup or container for the catholyte ($Na_xS_y$, for example) and an inverted, generally cylindrical cup for the anolyte ($Na°$, for example) are abutted against and joined in sealing arrangement to the peripheral portion of an intervening, horizontal, impervious, electrically non-conducting tubesheet/separator disc. The tubules or hollow fiber lengths have their lower ends closed and their upper ends open and pass through the tubesheet in sealing engagement therewith. The open ends of the fibers communicate with the molten alkali metal in the anolyte reservoir above the tubesheet and the portions of the fibers dependent from the tubesheet are immersed in the underlying molten catholyte. Wraps of a perforated, carbon-coated aluminum foil are interleaved between the (generally concentric) fiber rows and serve to collect and convey the cathode current to (or from) an external, electrical cathode connection. An anodic electrode is immersed in the molten metal, which also functions as a current collector, and extends through the anolyte container, in sealing engagement with the same, to provide an external, electrical anode connection.

Tubesheet-fiber assemblies of the type employed in the above-described cell can be made as follows. A plurality of the hollow electrolyte fibers are closely spaced upon an elongated generally rectangular sheet of electrically and thermally conductive material, such as a foil. The sheet has first and second elongated edges. The fibers are positioned generally parallel to one another and transversely to the elongated axis of the sheet. In positioning the fibers, the open ended portions are allowed to extend to a uniform degree beyond the first elongated edge of the sheet thereby to provide a margin. The opposite or closed ends of the fibers may be allowed to uniformly approach the second elongated edge of the sheet with the sheet extending beyond the closed ends of the fibers to form a skirt. A very small amount of a readily decomposed or catholyte-compatible adhesive may be used to maintain the fibers in their respective places after they have been positioned.

Once the fibers are positioned, the fibers, foil and skirt can be rolled up. While this is being done, a band of a potting compound of a solid or paste-like consistency) is applied to the fibers between the open ends thereof and the first elongated edge of the sheet, i.e., the potting compound is applied along the open-ended portions of the fibers forming the margin, just ahead of the nip of the forming roll. (If the width of the band of potting compound is less than the width of the margin, the unpotted terminal portions of the open fiber ends will protrude from the tubesheet, once it is formed by rolling up the assembly.)

A strip of the same conductive material which is equal to or greater in thickness than a fiber diameter is positioned adjacent to the second elongated edge of the sheet to function as a conductive spacing tape having about the same width as the skirt.

The sheet, fibers, spacing tape and potting material are then rolled up, preferably about a mandrel or core. The core may be electrically conductive, in which case a lower protruding end thereof can serve as a cathode terminal; or, it may be non-conducting. It can be left in the final "jelly roll" or removed.

As the roll is wound up, the band of potting compound forms a continuous layer adjacent to the open ends of the fibers. The continuity of the layer of potting compound is ensured by applying the band in a thickness corresponding to the thickness of the spacer tape. The final step in forming the potting compound into a fluid-impermeable tubesheet in sealing engagement with all the fibers is to cause a change to occur within the potting compound to produce a uni-bodied structure. This can be accomplished, for example, by chemically and/or thermally "curing" the compound. As it is generally desirable to encase the tubesheet/fiber assembly in one or more container or reservoir members which are in sealing engagement with the tubesheet, it may be desirable to postpone final setting of the potting material until the container members have been contacted with it. If the materials forming the container members and potting compound have been properly selected, the potting compound will form a sealing engagement with the container members during the setting process. Optionally, an adhesive can be used to bind the container members to the tubesheet after it has been formed.

At some stage of assembly while the bottom of the rolled-up assembly is still accessible, one or more weld beads are formed thereon by fusing successive sheet and spacer-tape edge portions together with a helium-shielded electric arc.

Other assembly methods are considered feasible but not presently very practical. However, the practice of the invention is not limited to tubesheet-fiber assemblies made by any particular method. Also, it will be recognized that the presence of an electrically conductive material, such as a foil, between the rows of fibers in the assembly, is not essential to the practice of the present invention. Other means of spacing the fiber rows from each other in the assembly will be apparent to those skilled in the art. Similarly, other electrically conductive means, such as micro-fibers of graphite mixed with the catholyte, may be introduced between the electrolyte fibers after the tubesheet-fiber assembly is formed. In another option, un uncoated, porous sheet (gauze or perforated foil) formed from a conductive, non-corroding metal, such as molybdenum, for example, may be employed as the cathodic current collector.

Once the tubesheet has been "cured" (to a unitary non-porous body, sealingly engaged with the fibers), the tubesheet-fiber assembly can be treated by the method of the invention to remedy leaks or to ensure the absence of same. However, even if the treated assembly includes foil wraps and a protruding mandrel end, it is difficult to handle in such manner that fiber breakage will not occur in the subsequent cell fabrication steps. It is therefore advantageous to delay the leak sealing treatment at least until the dependent protion of the fiber bundle is emplaced in and protected by the catholyte reservoir. Preferably, the treatment is delayed until all that is otherwise required to complete the cell is to introduce the anolyte and catholyte and close the fill ports in the anolyte and catholyte containers.

It should be noted that fibers of the types known to be suitable for use in high temperature battery cells are generally deleteriously effected by moisture and should be kept in low humidity environments. Such cells should be fabricated in "glove boxes" or "dry rooms".

The coefficients of expansion of the sealant and fiber materials should substantially match. The extent of mismatch between the coefficients of expansion of the cured sealant (plug) and the fiber materials which can be tolerated in a given assembly depends on the flexibilities of the different materials and on the absolute differences ($\Delta t$, °C.) between the temperature at which the plugs are formed and the temperature furthest removed therefrom which the cell is likely to attain thereafter.

To avoid imposition of high thermal stresses, the difference between the coefficients of expansion ($\Delta x$) should be such that the product $(\Delta x)(\Delta T)(E)$ is not greater than 3 kilograms per square millimeter, where E is the Youngs modulus of elasticity (kg/mm$^2$) for whichever material the sealant or the fibers has the lowest modulus.

For tubesheet/fiber assemblies to be used in high temperature Na/S batteries as described earlier herein, the maximum value of $\Delta T$ will usually be the difference between ordinary ambient temperatures (say 25° C.) and the highest temperature (say about 400° C.) which the sealant plugs are likely to be subjected in operation of the battery.

At this $\Delta T$ ($\sim 375°$), assuming a modulus of 7000 kg/mm$^2$ for the sealant, the value of $\Delta x$ must be less than $1.143 \times 10^{-6}$ units/° C. if $(\Delta x)(\Delta T)(E)$ is not to exceed 3 kg/mm$^2$.

In ordinary applications, permeability separatory devices will not be subjected to temperatures so high (or low) that a close match in coefficients of expansion will be required. Furthermore, the various resinous materials from which the fibers and tubesheets in such devices are made will usually not differ very much in expansion coefficients. Also, the fibers will generally be more flexible and much less fragile than glass or ceramic fibers (except at unusually low temperatures). Consequently, a much wider variety of sealants may be selected from in practicing the present invention with such devices.

Methods of fabricating hollow fiber type permeability separatory devices are now so well known as not to require description herein. Similarly, those knowledgeable in the art, having read these specifications, will be able to select a sealant for a given such device without further guidance and require no special listing herein of sealants (or diluents) suitable for permeator applications.

If the leak-sealing treatment is to be carried out before the tubesheet/fiber assembly has been incorporated in the cell, i.e., permanently enclosed in the cell casing, it will be necessary to temporarily encase it in such manner that the requisite pressure differentials can be developed or imposed between the fiber interiors and exteriors.

The step in which the undiluted sealant is drawn into the defective fibers is conveniently carried out as follows. The dependent portion of the fiber bundle is lowered into a cup, having an interior shoulder on which a soft, annular gasket is disposed, until the tubesheet periphery ("flange") rests on and compresses the gasket. The sealant is confined, by the portion of the cup wall above the shoulder, so that it covers the upper tubesheet face, and is open to the ambient atmosphere. The force of capillary attraction between the interior walls of the fibers and the sealant will usually suffice to draw the sealant into the defective fibers at a satisfactory rate. In this case, the developed "pressure differential" is the ratio of the capillary force to the interior diameter of the fibers. However, if desired, the pressure exterior to the fibers may be lowered, relative to the pressure on the sealant, to speed up the sealant flow. It is even possible to apply a positive pressure on the sealant, but care must be taken not to push sealant into the good fibers so far that it will not be adequately expelled in the next step of the procedure.

As a rule of thumb it will be sufficient if the sealant column formed in a defective fiber or channel extends into it several fiber diameters. The sealant depth required to accomplish this in a certain length of time can be estimated from the specific gravity, viscosity and surface tension of the sealant, the wetting angle of the sealant on the fiber material, and the fiber lumen diameter, by application of well known principles. However, this depth is easily determined empirically.

When the pressure exterior to the fibers is reduced, the compressive force exerted on the gasket as a consequence of the pressure differential across the tubesheet will usually suffice to prevent flow of sealant around the edge of the tubesheet. However, if necessary, resort may be had to clamping, weighting, etc.

To carry out the step in which (the sealant is diluted and) the gas in the good fibers is caused to expand, the pressure on both sides of the tubesheet must be made lower than the pressure exerted by that gas. Also, there should be no substantial difference between the pressures on the sealant and the fiber exteriors; if the latter pressure exceeds the former, the sealant in the bad fibers will tend to flow back out of them and, in the reverse situation, more sealant than is needed will flow into (or through) the broken fibers. Accordingly, it is necessary to enclose both the fiber bundle below the tubesheet and the sealant body above the tubesheet.

The simplest way of doing this is to support the tubesheet/fiber assembly within a single, closed container which can be connected to a source of reduced pressure, and is provided with means for introducing a diluent to the sealant body. However, the bundle and the sealant may be enclosed in separate, opposed "cups" or casing halves which are sealed to opposite sides of the tubesheet flange and are each provided with the requisite means for connection to a source of reduced pressure.

It will be recognized that the latter arrangement is essentially that of a hollow fiber-type battery cell in which the fiber bundle is disposed in a catholyte reservoir sealed to the lower surface of the tubesheet flange and an (inverted) anolyte reservoir is sealed to the upper surface of the flange, each reservoir being provided with its own fill port. It will also be apparent that said arrangement is perfectly suitable for carrying out the above-discussed step in which the sealant is drawn (or forced) into the bad fibers; that is, the upper cup may be pressurized or the lower one depressurized, independently.

Both steps of the present method which require development or imposition of pressure differentials may also readily be carried out with a hollow fiber battery cell (which has not been charged with anolyte or catholyte) of a novel type disclosed in a co-pending application, Ser. No. 939,156, filed Sept. 1, 1978 in the names of J. N. Anand, T. T. Revak and F. J. Rossini and entitled "High temperature Battery Cell Comprising Stress-Free Hollow Fiber Bundle". In cells of the latter type, a sub-assembly comprising the anolyte cup, the tubesheet, the fibers and a cathodic current-collecting means (such as foil wraps) is suspended within an outer casing. (The latter collecting means is joined to the outer casing (or to a cathode terminal mounted therein) by a limp connection.) That is, the catholyte container is not sealed to the tubesheet and extends up around (but is spaced apart from) it and the anolyte cup. The outer casing is closed around and engaged, by an insulating seal, with a tubular extension of the anolyte cup (which acts both as the anode terminal and the anolyte fill port). The casing top includes a second protruding tube which functions as a catholyte fill port and may also function as the cathode terminal of the cell when the casing is electrically conductive.

In both the latter type of cell and more conventional hollow fiber battery cells, the anolyte fill port may be employed in the present process for introduction (and removal) of the sealant and diluent (or the diluted sealant). Both the anolyte and catholyte fill ports may be utilized for pressurization or depressurization of the anolyte and catholyte cups, respectively.

(Of course, when the leak-sealing operation is carried out on a completely assembled cell, the tubesheet will generally have been fully "cured" before the tubesheet/fiber assembly was incorporated in the cell.)

The diluted sealant is removed from contact with the tubesheet by tilting or inverting the encased tubesheet/fiber assembly. Ordinarily, it can simply be drained out of the fill port (or equivalent means) into a trap which is appropriately connected to the vacuum source.

If the tubesheet face is rinsed, the same fill port (or other means for fluid ingress or egress) may be used to introduce the rinse—either as a spray or as a liquid—and subsequently to remove it.

The sealant in the defective fibers and/or tubesheet channels is solidified to non-porous, solid plugs, as by removing any volatiles and "curing" or "setting" the non-volatile constituents thereof. The latter operation may be carried out by such means as sintering or by inducing chemical linking reactions (as by use of catalysts, simple heating or electromagnetic irradiation).

Ordinarily, removal of volatiles will be most conveniently carried out in a first stage of heating, at temperatures below those required for curing. If the material to be removed is high boiling and/or gases are generated in either stage, reduced pressures will generally be employed in at least one stage of the plug-forming operation. Conveniently, both stages are carried out in the same apparatus (heating means, jacket, cold trap, vacuum pump, etc.) and with both ends of the defective fibers subjected to the same reduced pressure.

In a preferred mode of operation the plugs in the defective fiber lengths are composed of the same relative amounts of the same ingredients as the tubesheet itself, thus assuring an even match in expansion coefficients. In this mode, the sealant conveniently (and preferably) is a solution (or slurry) of the tubesheet material (or particles thereof) in a readily volatilzed, or controllably reactive, and otherwise suitable liquid medium.

Any undissolved particles present in the sealant composition should have maximum diameters which are about $\frac{1}{3}$ or less of the inner diameters of the fiber portions to be plugged. Otherwise, bridging of the particles may occur, thus preventing the sealant from flowing far enough into the defective fibers. Preferably, the particle diameter is not greater than 1/5 the fiber diameter.

In a typical application of the present method to high temperature batteries, tubesheet glass fines having maximum diameters of about 10 microns or less will be found suitable for plugging defective fibers having an inner diameter within the range of from about 30 to about 80 microns.

Although not indispensable, volatilizeable or non-detrimental suspending agents preferably are included in sealants comprising glass or ceramic particles. For example, aliphatic primary amines of from about 12 to about 42 carbons have been found particularly suitable for this purpose in preparing slurries (in aromatic solvents) of finely ground sodium borate glasses.

The method of the invention is most conveniently carried out in ordinary environments but may be practiced under such conditions as are feasible to establish and maintain in dry boxes ("glove boxes"), dry rooms and the like.

Practice of the invention with tubesheet/hollow fiber assemblies suitable for use in high temperature batteries is illustrated by (but not limited to) the following procedure.

Hollow glass fibers having an inner diameter of about 50 microns and an outer diameter of about 70 microns are prepared from a molten glass having the composition $Na_2O$, $2B_2O_3$, 0.16 NaCl, 0.2 $SiO_2$, in the manner described in U.S. Pat. No. 4,050,915.

Fragments of a solder glass (94% $B_2O_3$, 6% $Na_2O$) are converted to a fine powder (particle size less than 10 microns) by grinding them in the manner disclosed in U.S. Pat. No. 3,917,490. An extrudable tubesheet composition is made by mixing 2 parts by weight of the fines and 2 parts of −250 mesh (U.S. Std) spheres of the same solder glass with about 0.4 parts of cumene.

A hollow fiber and tubesheet assembly adapted for use in a "stress-free", high temperature battery is assembled, essentially in the manner described earlier herein, from lengths of the preceding fibers, open at one end and closed at the other. The assembly includes a carbon-coated, perforated aluminum foil strip, a spacer skirt of the same foil and a central mandrel (aluminum rod). The tubesheet is formed by extruding the preceding composition on the open-ended portions of the fibers extending beyond the foil edge, as the assembly is rolled up, and then built up further, to form a flange. The resulting disc or wall member is heated with an infrared lamp until (several hours) it is dry (essentially cumene-free) and self-supporting (rigidified). The open ends of the fiber lengths are flush with the other (upper) face of the tubesheet and the closed ends depend about 10 cm from the inner (lower) face.

The thus formed "green" tubesheet is cured by heating the assembly to degrade and/or remove the cement components and any remaining suspension medium and to fuse together the glass or ceramic particles in the disc to form a densified, unitary tubesheet member with which the fiber portions passing through it are bonded in sealing engagement. This is done by supporting the sub-assembly at the tubesheet flange in an open pyrex container, which in turn is fitted closely with a closed metal casing, connecting the casing to a vacuum pump and placing the casing (and contents) in a furnace. The disc is heated, essentially by irradiation from and through the pyrex container, to a temperature of about 340° C. and kept at that temperature for about 2 hours. It is next further heated in the same manner, for about 4 hours at a final temperature which is about 15° above the glass transition temperature of the tubesheet material but well below the glass transition temperature of the fiber material, and is then allowed to (slowly) cool. With the solder-glass type of tubesheet materials disclosed in the above cited U.S. Pat. No. 3,917,490 the final temperature will range from about 370° to about 400° C.

A generally bell-shaped, aluminum or stainless steel anolyte tank—which may aptly be characterized as having the shape of an inverted funnel, by reason of comprising a tubular, upward extending section—is prepared for sealing engagement with the tubesheet. The rim of the lower portion of the tank is immersed (with or without being preheated) in a body of molten tubesheet glass until the rim is essentially at the temperature (·700° C., for example) of the glass, then carefully withdrawn, together with a thin, adherent layer of the glass, and allowed to cool slowly and evenly.

The assembly is supported (by the protruding mandrel end) with the tubesheet in a horizontal position and the glass-coated rim of the anolyte tank is positioned on the tubesheet flange. The rim (and the adjacent wall section) of the tank is induction heated by a surrounding, water-cooled coil of copper tubing connected to a source of radio-frequency, alternating current (a Lepel generator, for example). The heating is controlled so that the glass (or ceramic) coating on the rim and the portion of the tubesheet in contact with it reaches the sintering temperature of the glass. This temperature is maintained until the rim of the tank has slightly penetrated the flange and then the resulting seal is allowed to cool slowly.

Several heli-arc weld beads are run (see the above cited U.S. Pat. No. 3,791,868) radially across the lower surface of the coil formed by the wraps of foil skirt and spacer tape, between the periphery of the surface and its juncture with the protruding portion of the mandrel, thereby locking the coil together and providing better electrical continuity to the mandrel. The protruding portion of the mandrel is then melted off just below its junctures with the inner ends of the weld beads.

A strip of foil, which may be a free end of the spacer tape or a separate length thereof, is heli-arc welded to the coil bottom in such manner that it hangs freely from but is solidly connected thereto. The dependent strip now constitutes a limp connecting link and the inner assembly of the cell is essentially complete.

The inner assembly is lowered into a stainless steel casing sleeve. The sleeve is open at both ends and includes a tapered wall section which is intermediate of an upper, generally cylindrical wall section of greater diameter and a lower, generally cylindrical section of reduced diameter, thereby defining a generally frusto-conical inner surface. The assembly is lowered until the (conforming) peripheral surface of the tubesheet flange rests on the frusto-conical surface.

A top wall for the casing is prepared from a circular, stainless steel disc. A first hole is drilled at the center of the disc and a second hole is drilled near the edge. A prefabricated seal, consisting of upper and lower iron/nickel/cobalt alloy (KOVAR ®) tubes bonded to an intervening hard glass insulator sleeve is centered over the first hole and the end of the bottom tube welded to the disc. Similarly, a length of stainless steel tubing (which will later function as both a catholyte fill port and as the cathodic electrical terminal of the cell) is centered over the other hole and welded onto the disc.

The top wall is positioned on the casing by slipping the insulating seal down around the protruding tubular section of the anolyte tank (the "stem" of the "inverted funnel"). The inner assembly is raised, by the stem end, until the tubesheet flange is spaced apart from the frusto-conical wall section by a horizontal distance sufficiently less than the radial distance between the outer foil wrap on the fiber bundle and the lower casing side wall so that any lateral motion of the inner assembly will be stopped before any portion of the bundle (etc.) touches that wall. (The vertical distance between the flange and frusto-conical wall section must be sufficient to accommodate expansive and contractive motions of the inner assembly, however.) The casing top is now welded onto the casing.

The top of the upper tube of the seal is next welded to the projecting "stem" end. The inner assembly is thus suspended from the top wall of the casing; the upper end of the tubular anolyte tank section and tube is adapted to function as both a fill port and as the anodic electrical terminal of the cell.

The lower end of the foil strip depending from the coil is welded to a stainless steel disc (casing bottom wall). The strip is folded, without being creased, and the disc is welded to the casing. The unfilled cell is now essentially complete.

To ensure that all welds which should be so are hermetic, the cell is tested in any suitable manner, such as by connecting both fill ports to the same nitrogen cylinder, pressurizing the cylinder to a suitable pressure (25 psig, for example), immersing it in a liquid for at least 15 minutes and noting any locations where bubbles escape from the cell.

The cell is next subjected to a helium leak test to determine whether any fibers have been broken or the tubesheet is cracked. This is done with a commercial helium detector (a Varian, Model 925-40, mass spectrograph unit which can detect helium flows as small as $10^{-9}$ c.c. (measured at standard conditions) per second).

The anolyte fill port is connected to the helium detector. The catholyte port is connected by a three-way valve to a helium tank and a vacuum source. The cell volume external to the anolyte tank and fibers is evacuated briefly and then restored to atmospheric pressure with helium gas. If the rate of helium flow through the detector is so low ($<10^{-9}$ c.c./second) as not to be detectable, the sub-assembly is considered leak free. (A typical helium flow when a leak results from imperfect bonding between the tubesheet and a fiber is about $10^{-7}$ c.c./second.)

If the cell is not found to be helium-tight, it is treated as follows.

A sealant slurry is prepared by mixing some of the preceding solder glass powder with a 1 wt. % solution each of n-dodecyl amine and n-decyl amine in cumene in a ratio of 0.5 gram of the solution per gram of fines. This slurry is deposited, by means of a pipette inserted through the anolyte fill port, on the upper tubesheet face as a covering layer about 0.5 cm deep (both fill ports of the cell are open to the ambient atmosphere). After this layer has been allowed to stand about 30 seconds, about 5 volumes of cumene (diluent) are added to it.

The catholyte fill port is now connected directly to a vacuum gauge and to a needle valve in turn connected (through a cold trap) to a vacuum pump. The anolyte port is connected through a tube inserted in a stoppered filter flask, and through the side arm of the flask, to the same needle valve. The valve is opened, and the pressure in the system reduced (in about 30 seconds) to about 0.5 atmosphere, thus causing the (slightly compressed) air in the good fibers to expand. The cell is next inverted while the pressure continues to drop (to less than about 254 mmHg, in another minute) and the diluted sealant is drained from the anolyte tank to the filter flask. The cell is turned upright, the needle valve closed, and another 5 volumes of cumene is now introduced (by injection) as a rinse, to the upper tubesheet surface and allowed to stand while the system is kept under reduced pressure. After about 30 seconds, the cell is inverted, the needle valve is reopened and the rinse drained to the filter flask. The lines to each side of the flask are pinched shut and the system pumped down to a steady pressure of about 1 mmHg. After about 10 minutes, the cell is righted. The needle valve is closed, disconnected from the vacuum pump and then slowly reopened to return the system to atmospheric pressure.

The cell is disconnected from the lines and heated in vacuo to 378° C., thereby devolatilizing the slurry columns in the leaks (defective fibers and/or tubesheet channels) and is then held at this temperature (still in vacuo) for 4 hours, to "cure" the non-volatile residium of the sealant, i.e., to fuse the solder glass particles (in each leak) into an impermeable plug.

The treated cell is slowly cooled, retested with the helium leak detector and found "helium-tight". It is now ready to be charged with anolyte and catholyte and sealed shut.

The ways in which the foregoing procedure should be modified in order to adapt it to other hollow fiber battery cell designs or to the other types of hollow fiber devices, such as reverse osmosis units, ultrafilters, so-called "artificial kidneys", etc., will be apparent to those skilled in the art. Thus, the present invention is not to be construed as limited in application to device configurations, materials or conditions specifically disclosed herein in a manner inconsistent with the following claims.

What is claimed is:

1. The method of treating a tubesheet/hollow fiber assembly to ensure that any defective fibers and/or tubesheet channels included therein will be selectively plugged, said method comprising
   A. providing as said assembly one which comprises a bundle of gas-filled, hollow fiber lengths passing through and sealingly engaged with a rigid, relatively thin wall-member of tubesheet having first and second generally parallel faces, each of said lengths having an open end terminating in or protruding from said first face and at least a majority of said lengths having portions depending from said second face which have closed ends or are generally U-shaped loops having second open ends terminating in or protruding from said first face,
   B. covering said first face with a body of a flowable, curable sealant and developing a pressure differential between said body and the exteriors of said dependent fiber portions, thereby
      (1) causing said sealant to flow into the defective fibers and/or tubesheet channels and to displace therefrom at least a portion of the gas contained therein, and
      (2) causing said sealant to flow into the open ends of the non-defective fibers to a limited extent determined by the resistance to compression of the gas they contain,
   C. diluting the sealant external to the fibers,
   D. subjecting the exteriors of said dependent fiber portions and the diluted sealant body to essentially the same reduced pressure, with the results that:
      the gas in the non-defective fibers expands until the pressure inside them is the same as the pressure outside them,
      the undiluted sealant in the non-defective fibers is expelled and the diluted sealant intrudes slightly into them,
      the column of sealant in each defective fiber and tubesheet channel remains in place and no more than a small terminal portion of it is diluted, E. While maintaining the pressure equilibrium established in step D, removing the main body of the diluted sealant from contact with the tubesheet, F. optionally, rinsing said first face and open fiber ends with a diluent, and G. curing the sealant in the defective fibers and/or tubesheet channels, thereby plugging them, said sealant being so composed as to be convertible, in-situ in said defective fiber lengths or channels and at a temperature below the distortion temperature of said fibers, to plugs of a solid, non-porous material sealingly bonded to the fiber or channel walls and having a coefficient of expansion substantially matching that of the fiber material.

2. The method of claim 1 wherein:

said fiber lengths are adapted to function as the electrolyte/separator in a high temperature battery cell, said sealant is a suspension, in an inert volatilizeable liquid, of glass or ceramic particles which have a maximum diameter of about ⅓ or less of the inner diameter of said fiber lengths and will fuse together to form said plugs when heated to a temperature, $T_1$, which is less than the distortion temperature of said lengths, and said assembly is heated to $T_1$, thereby devolatilizing said suspension in said defective fibers and/or tubesheet channels and converting said particles to said plugs.

3. The method of claim 1 when carried out after said assembly has been incorporated in a casing adapted to function as a component of a complete hollow fiber device.

4. The method of claim 2 wherein said cell is an alkali metal/sulfur battery cell.

5. The method of claim 4 wherein said alkali metal is sodium.

6. The method of claim 2 wherein said tubesheet and said particles have essentially the same composition.

7. The method of claim 2 wherein said assembly additionally comprises a perforated metallic sheet disposed therein as a plurality of generally concentric wraps spiralled about the central axis of said bundle and separated by intervening, generally concentric layers of said fiber lengths.

8. The method of claim 1 or 2 wherein said open ends terminate in said first face.

9. A tubesheet and hollow fiber assembly treated by the method of claim 1.

* * * * *

UNITED STATES PATENT AND TRADEMARK OFFICE
CERTIFICATE OF CORRECTION

PATENT NO. : 4,226,921

DATED : October 7, 1980

INVENTOR(S) : Floris Y. Tsang

It is certified that error appears in the above—identified patent and that said Letters Patent is hereby corrected as shown below:

Column 4, line 7, last "the" in sentence should be -- and --;

Column 5, line 45, "selected" should be -- elected --;

Column 11, line 36, "other" should be -- outer --;

Column 14, line 35, "of" should be -- or --;

Signed and Sealed this

Seventeenth Day of March 1981

[SEAL]

Attest:

RENE D. TEGTMEYER

Attesting Officer — Acting Commissioner of Patents and Trademarks